(12) United States Patent
Kissel

(10) Patent No.: US 8,072,743 B2
(45) Date of Patent: Dec. 6, 2011

(54) MONITOR DEVICE ON BOARD

(75) Inventor: Robert Wolfgang Kissel, Egelsbach (DE)

(73) Assignee: Continental Automotive GmbH, Hannover (DE)

( * ) Notice: Subject to any disclaimer, the term of this patent is extended or adjusted under 35 U.S.C. 154(b) by 427 days.

(21) Appl. No.: 12/227,922

(22) PCT Filed: May 25, 2007

(86) PCT No.: PCT/EP2007/055073
§ 371 (c)(1),
(2), (4) Date: Dec. 1, 2008

(87) PCT Pub. No.: WO2007/137996
PCT Pub. Date: Dec. 6, 2007

(65) Prior Publication Data
US 2010/0226086 A1    Sep. 9, 2010

(30) Foreign Application Priority Data

May 31, 2006  (DE) .......................... 10 2006 025 383

(51) Int. Cl.
*G06F 1/16* (2006.01)

(52) U.S. Cl. .................... 361/679.21; 345/87; 248/27.1; 224/483; 292/70

(58) Field of Classification Search ............. 361/697.21; 345/87; 248/27.1; 224/483
See application file for complete search history.

(56) References Cited

U.S. PATENT DOCUMENTS

| 5,173,686 | A | * | 12/1992 | Fujihara ........................ 345/87 |
| 5,475,787 | A | | 12/1995 | Kato |
| 6,011,685 | A | * | 1/2000 | Otsuki ..................... 361/679.01 |
| 6,049,288 | A | * | 4/2000 | Kawasaki ................. 340/815.4 |
| 6,499,788 | B2 | * | 12/2002 | Ito et al. ........................ 296/70 |
| 6,570,628 | B1 | * | 5/2003 | Hirano ............................ 349/11 |
| 6,583,773 | B1 | * | 6/2003 | Nogami et al. ................... 345/7 |
| 6,731,350 | B2 | * | 5/2004 | Endo et al. ..................... 348/837 |
| 6,926,329 | B2 | * | 8/2005 | Neumann et al. .......... 296/24.34 |
| 7,441,738 | B2 | * | 10/2008 | Kim ......................... 248/292.12 |
| 7,685,901 | B2 | * | 3/2010 | Leopold et al. ................. 74/434 |
| 7,733,634 | B2 | * | 6/2010 | Sano et al. .............. 361/679.02 |
| 7,830,460 | B2 | * | 11/2010 | Ido .............................. 348/837 |
| 2001/0042990 | A1 | * | 11/2001 | Ito et al. ......................... 296/70 |
| 2002/0101091 | A1 | | 8/2002 | Ito |
| 2002/0121873 | A1 | | 9/2002 | Aoki |
| 2005/0224689 | A1 | | 10/2005 | Tanaka |
| 2005/0236527 | A1 | * | 10/2005 | Takagi .......................... 248/27.1 |
| 2006/0108900 | A1 | * | 5/2006 | Lee ............................. 312/319.6 |
| 2006/0232527 | A1 | * | 10/2006 | Oh ................................ 345/87 |
| 2007/0138822 | A1 | * | 6/2007 | Feit et al. ........................ 296/70 |

(Continued)

FOREIGN PATENT DOCUMENTS

DE         694 05 313 T2    2/1998

(Continued)

*Primary Examiner* — Lisa Lea Edmonds
(74) *Attorney, Agent, or Firm* — Cozen O'Connor

(57) ABSTRACT

The invention relates to a monitor device on board for a motor vehicle, with a monitor (4) which can be drive-displaced, by means of a drive mechanism (6), from an inactive position in a recess (1) of a dashboard (2), through an opening (3) of the recess (1), into an active position outside the recess (1), as well as from the active position into the inactive position, wherein a covering (5) closing the opening (3) in the inactive position can furthermore be drive-displaced in a coupled manner by means of the drive mechanism (6) into the active position in which the opening (3) is exposed.

18 Claims, 7 Drawing Sheets

U.S. PATENT DOCUMENTS

2009/0090476 A1* 4/2009 Grandel et al. ............ 160/368.1
2009/0272776 A1* 11/2009 Baudisch et al. ............. 224/483

FOREIGN PATENT DOCUMENTS

| | | |
|---|---|---|
| DE | 199 38 690 A1 | 2/2001 |
| DE | 100 08 887 A1 | 10/2001 |
| DE | 101 00 931 B4 | 10/2001 |
| DE | 602 03 954 T2 | 1/2006 |
| EP | 1 308 348 A2 | 5/2003 |
| EP | 1 538 028 A2 | 6/2005 |
| EP | 1 544 040 A1 | 6/2005 |
| WO | WO97/46422 | 12/1997 |
| WO | WO 2009043783 A1 * | 4/2009 |

* cited by examiner

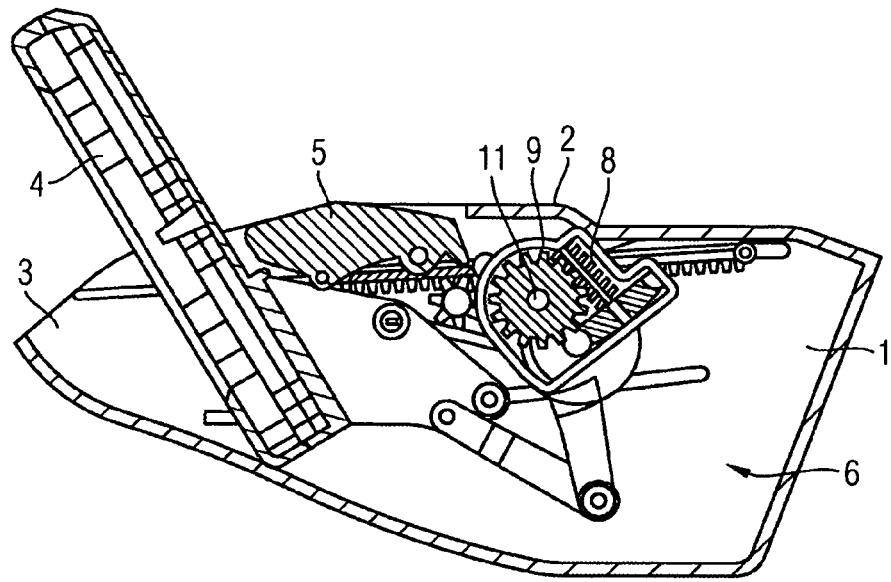
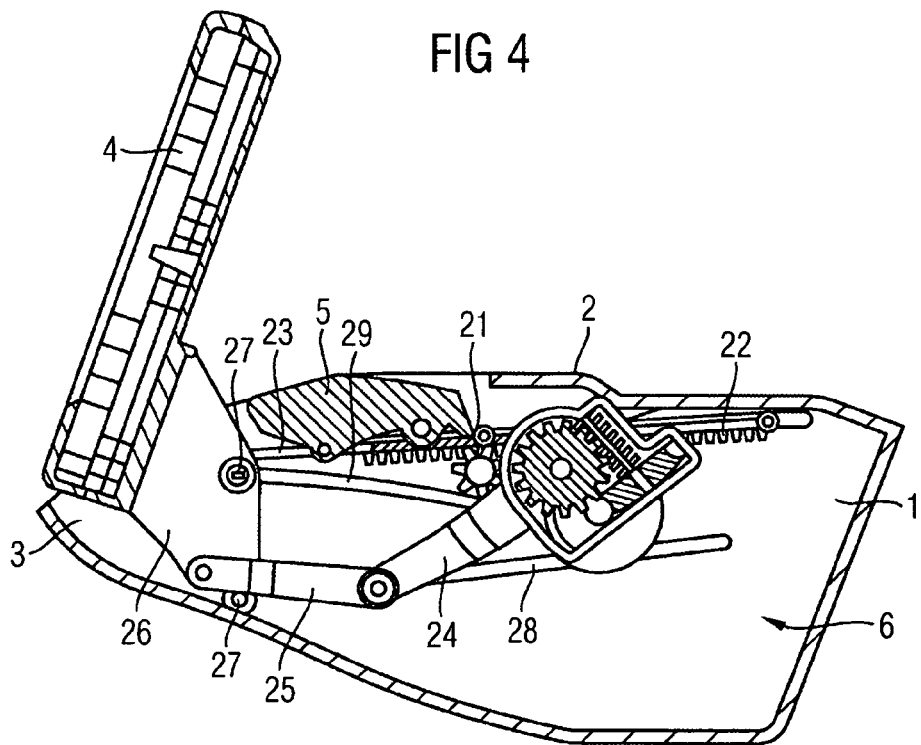

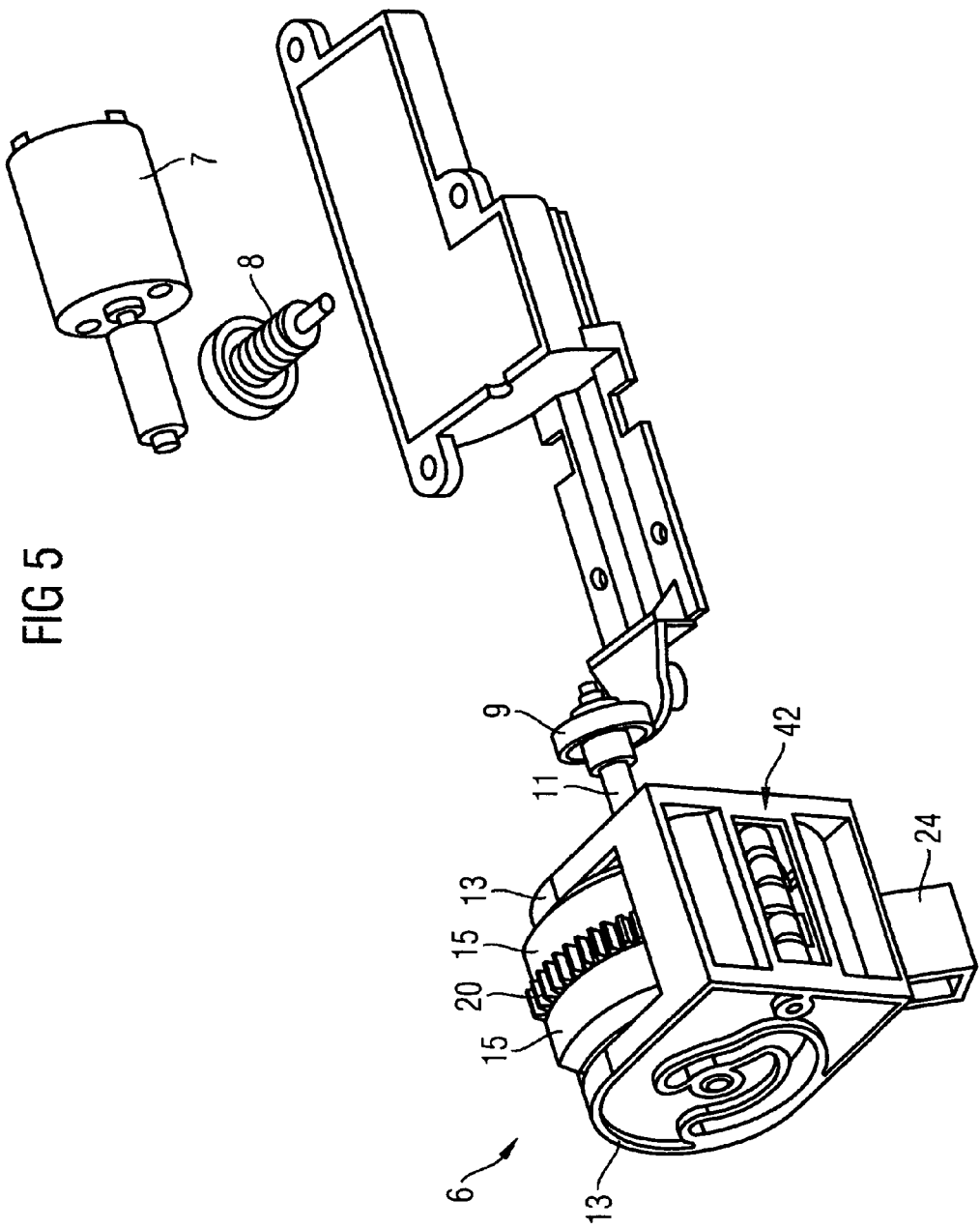

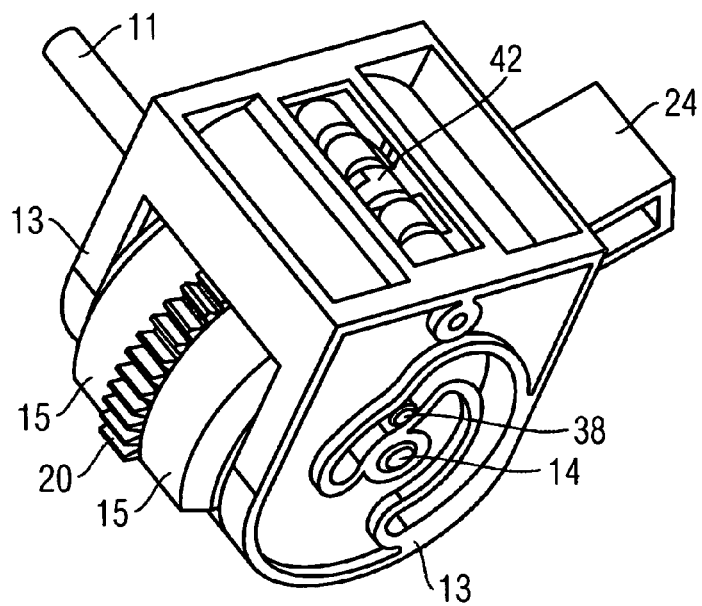
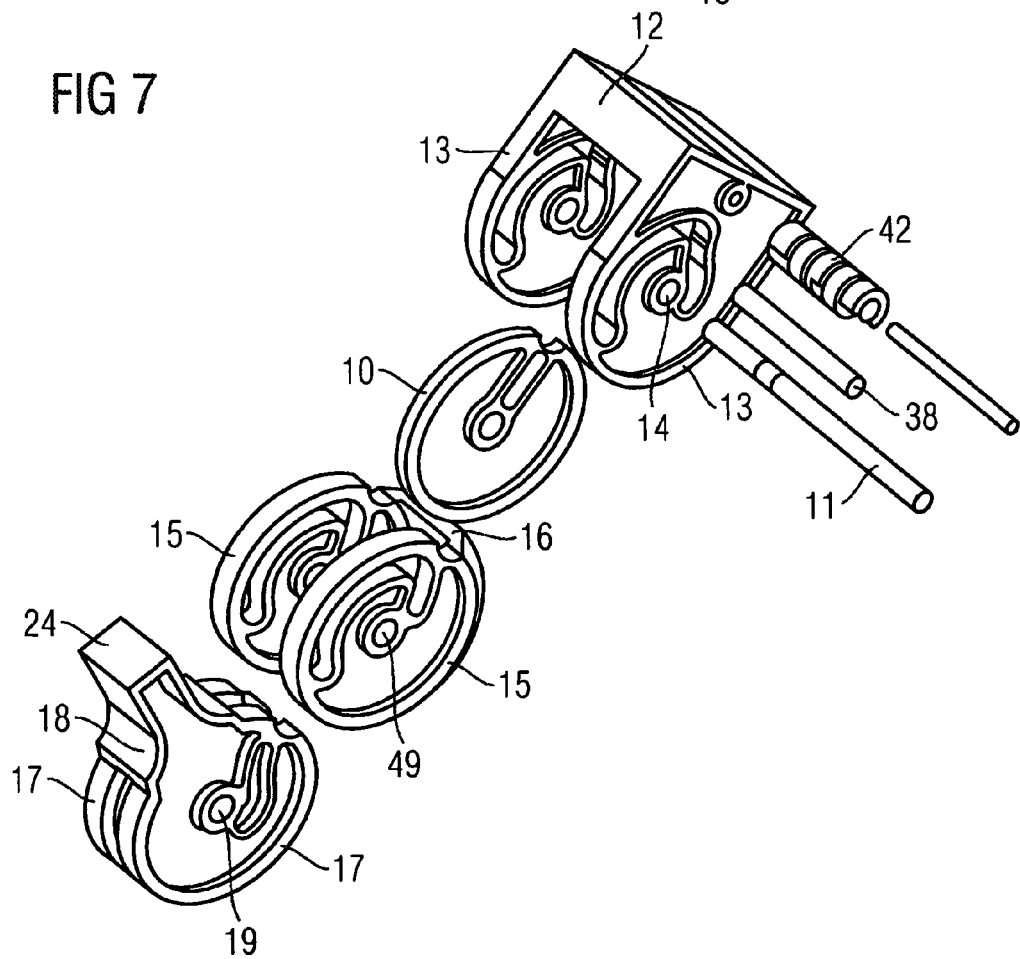

MONITOR DEVICE ON BOARD

PRIORITY CLAIM

This is a U.S. national stage of application No. PCT/EP2007/055073, filed on May 25, 2007 which claims priority to German Application No. 10 2006 025 383.3 filed May 31, 2006, the contents of both of which are incorporated herein by reference.

BACKGROUND OF THE INVENTION

1. Field of the Invention

The invention relates to an on-board monitor device for a motor vehicle, having a monitor which can be moved in a driven fashion by means of a drive mechanism from an inactive position in a recess in a dashboard through an opening in the recess into an active position outside the recess, and from the above position into the inactive position, wherein furthermore a cover which closes the opening in the inactive position can be moved in a driven fashion, coupled in terms of movement, by the drive mechanism into a position which clears the opening in the active position.

2. Description of the Prior Art

In such on-board monitor devices, in addition to the movable monitor a cover is to be driven which, after the monitor has been moved in into the recess, closes the opening in the dashboard and clears the opening before the monitor is moved out. In this context, the movements of the cover and monitor have to be coordinated with one another in such a way that a collision cannot take place with the monitor either during the opening or closing of the cover. This requires the position of the cover and monitor to be precisely defined at every point in time of the movement and in the stationary state.

In an on-board monitor device of the type described at the beginning, the drive mechanism of the monitor and cover has a guide linkage with a folding and sliding mechanism which can be driven by a drive motor.

SUMMARY OF THE INVENTION

An object of the invention is to provide an on-board monitor device of the type mentioned at the beginning which has a small overall size and ensures a collision-free movement sequence of the monitor and cover.

This object is achieved according to one embodiment of the invention in that arranged one next to the other coaxially with respect to an axis are a fixed control cam, a rotatably drivable drive disk, a freely rotatably mounted cover output disk for the movement drive of the cover and a freely rotatably mounted monitor output disk for the movement drive of the monitor, wherein the control cam has a control groove, the drive disk has a radial driving groove, the cover drive disk has a cover drive groove and the monitor drive disk has a monitor drive groove, having a coupling element which extends parallel to the axis and engages in the control groove, the driving groove, the cover drive groove and the monitor drive groove, wherein the control groove has a profile which corresponds to the combined profile of the cover drive groove and the monitor drive groove, and the cover drive groove and monitor drive groove have freewheeling regions, which determine the movement profile of the cover and monitor and are concentric with respect to the axis, and tangential driving regions.

This embodiment of the rotatable disks permits a very compact design which also requires only a small installation space in the dashboard.

Since both the cover drive disk and the monitor drive disk are driven by the drive disk by means of the coupling element, the cover and the monitor are inevitably driven in a coordinated way with respect to one another, with the result that a collision between these two parts is reliably avoided.

At the same time, the drive therefore requires only a very small amount of drive energy as well.

In a particularly simple embodiment, which requires no special installation space, the coupling element can be a coupling spigot with a cylindrical cross section which penetrates the control groove, the driving groove, the cover drive groove and the monitor drive groove parallel to the axis.

A drive can basically also be provided manually. However, it is convenient and permits a simple design if the drive disk is arranged in a rotationally fixed fashion on a drive shaft which can be driven in rotation by motor, in particular by electric motor.

In this case, the requirement for a very small installation space is met in a simple design if the cover drive disk and/or the monitor drive disk are mounted in a freely rotatable fashion on the drive shaft.

Sliding of the coupling element with easy movement results by virtue of the fact that the profile of the cover drive groove and monitor drive groove extends starting from an inactive position into an active position, counter to the opening movement rotational direction of the drive disk.

From the inactive position, in which the monitor is located in the recess which is closed by the cover, the opening of the recess is firstly enabled and the monitor subsequently moves out if the monitor drive groove has a profile which, beginning in the inactive position, has a concentric freewheeling region with a relatively small radius which is adjoined by a driving region which ends in a region with a relatively large radius in the active position, and in that the cover drive groove has a profile which begins with a driving region which extends from the inactive position in the region with the relatively small radius into the region with the relatively large radius and is adjoined by a concentric freewheeling region with the relatively large radius which ends in the active position, wherein the driving regions of the monitor drive groove and cover drive groove are the same.

In a reversed sequence, the monitor is then also moved in and the opening is closed.

A symmetrical transmission of force from the coupling element to the cover disks and monitor drive disks is brought about by virtue of the fact that two or more control cams and/or two or more drive disks and/or two or more cover drive disks and/or two or more monitor drive disks are each arranged parallel to one another at a distance, connected by a web which is parallel to the axis.

In this way, the coupling element does not become misaligned or tilt in the grooves and the force losses during the transmission of movement are kept small. This also permits the drive to be given a smaller configuration, which leads to a reduction in the necessary installation space.

A compact design with reliable, tilt-free guidance of the coupling element at control grooves which are arranged at a relatively large axial distance from one another occurs if one or more drive disks which are connected to one another by means of a web and one or more cover drive disks which are connected to one another by means of a web and one or more monitor drive disks which are connected to one another by means of a web are arranged guided axially between two control cams which are connected to one another by means of a web.

Free movement of the cover drive disk and/or of the monitor drive disk when the coupling element is located in the freewheeling region is avoided by virtue of the fact that the cover drive disk and/or the monitor drive disk can be locked in the end position of its freewheeling region.

For this purpose, in a simple embodiment, the cover drive disk and/or the monitor drive disk have, on their radially extending circumference, concentric to the axis, a locking depression into which a locking cam can engage radially, wherein the locking cam can be arranged on a cam shaft which is parallel to the axis and can be driven in rotation by the drive disk. This design saves installation space and is integrated into the movement sequence of the on-board monitor device.

For simple movement drive of the cam shaft, the drive disk can have a radial switching tooth here which can engage in a tooth gap of the cam shaft.

Integration into the movement sequence of all the parts of the on-board monitor device is brought about by virtue of the fact that the switching tooth and the locking cams for the cover drive disk and the monitor drive disk are arranged on a common cam shaft corresponding to the arrangement of the drive disk, cover drive disk and monitor drive disk one next to the other.

A compact design, which requires few components, is obtained by virtue of the fact that the cam shaft is freely rotatably mounted on the control cam or control cams.

Here, the cam shaft can be blocked in its position in order to prevent undesired automatic rotation.

In a simple embodiment, for this purpose the drive disk has, parallel next to the switching tooth, a circumferential contour which is concentric with respect to the axis and has, in the region of the tooth, a recess in which a blocking cam, arranged next to the tooth gap, of the cam shaft can engage in a freely rotatable fashion, wherein the edges of the blocking cam are in abutment in the external engagement position of the blocking cam of the recess tangentially on the circumferential contour of the drive disk.

In order to drive the cover drive disk, the cover drive disk can have a tooth sector which is concentric with respect to the axis and which engages in a pinion of a drive train for the movement drive of the cover.

The monitor can easily be driven by virtue of the fact that the monitor drive disk has a radial lever which is coupled in an articulated fashion at its free end to a drive coupling of a drive train for the movement drive of the monitor.

BRIEF DESCRIPTION OF THE DRAWINGS

An exemplary embodiment of the invention is illustrated in the drawings and is described in more detail in the text which follows. In the drawings:

FIG. 3 shows the on-board monitor device according to FIG. 1 with a partially moved-out monitor;

FIG. 4 shows the on-board monitor device according to FIG. 1 in the active position;

FIG. 5 shows a perspective exploded illustration of the drive mechanism and drive monitor of the on-board monitor device according to FIG. 1;

FIG. 6 shows a perspective view of the drive mechanism according to FIG. 1;

FIG. 7 shows a perspective exploded illustration of the drive mechanism according to FIG. 6;

DETAILED DESCRIPTION OF THE PRESENTLY PREFERRED EMBODIMENTS

Figure 1:
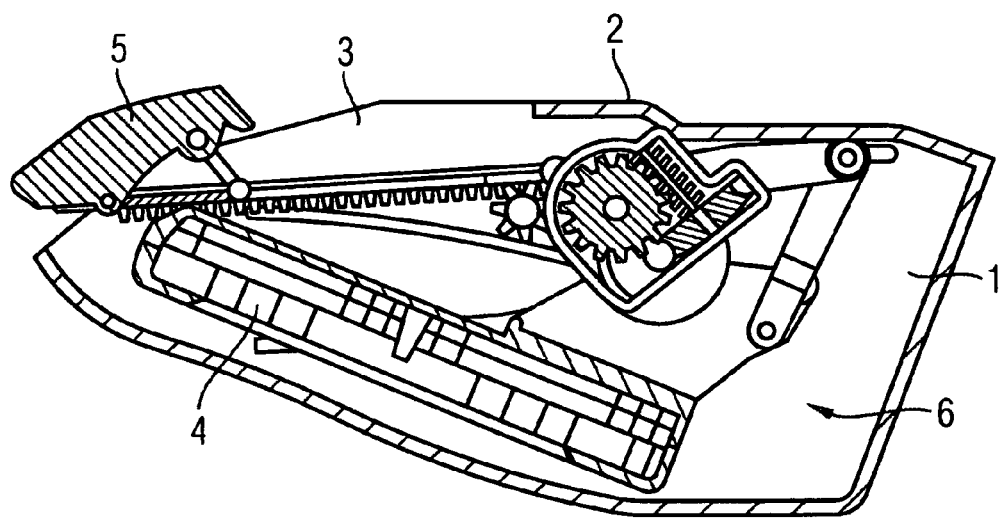
FIG. 1 shows a cross section of an on-board monitor device in the inactive position according to one embodiment of the invention.
Figure 2:
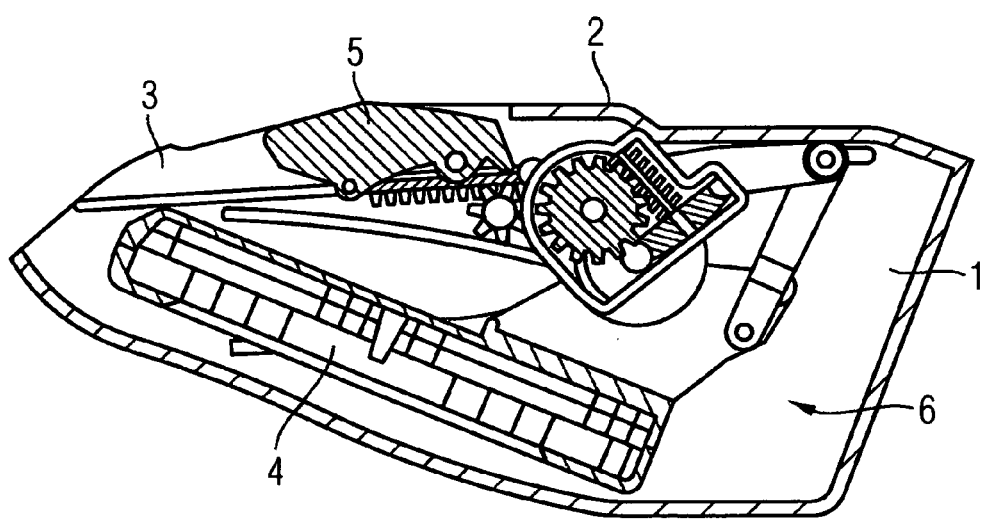
FIG. 2 shows the on-board monitor device according to FIG. 1 with an opened cover.
Figure 8:
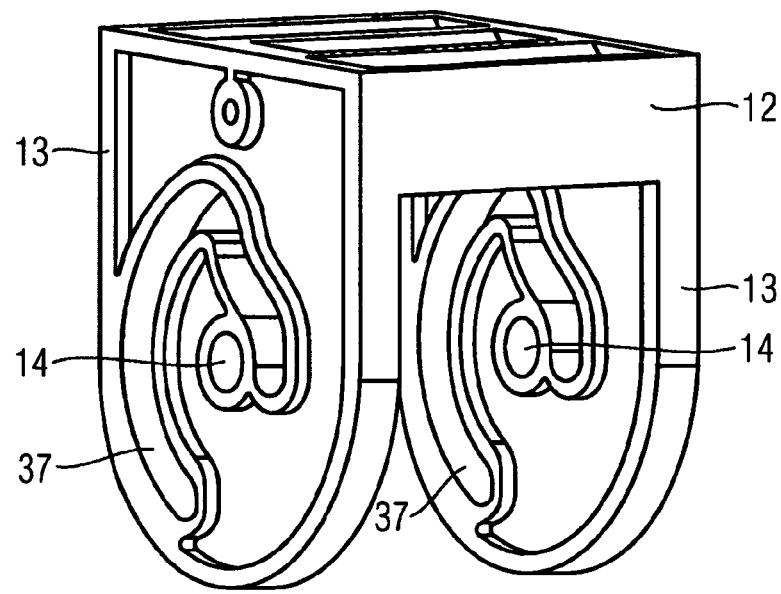
FIG. 8 shows a perspective view of the control cams of the drive mechanism according to FIG. 6.
Figure 9:
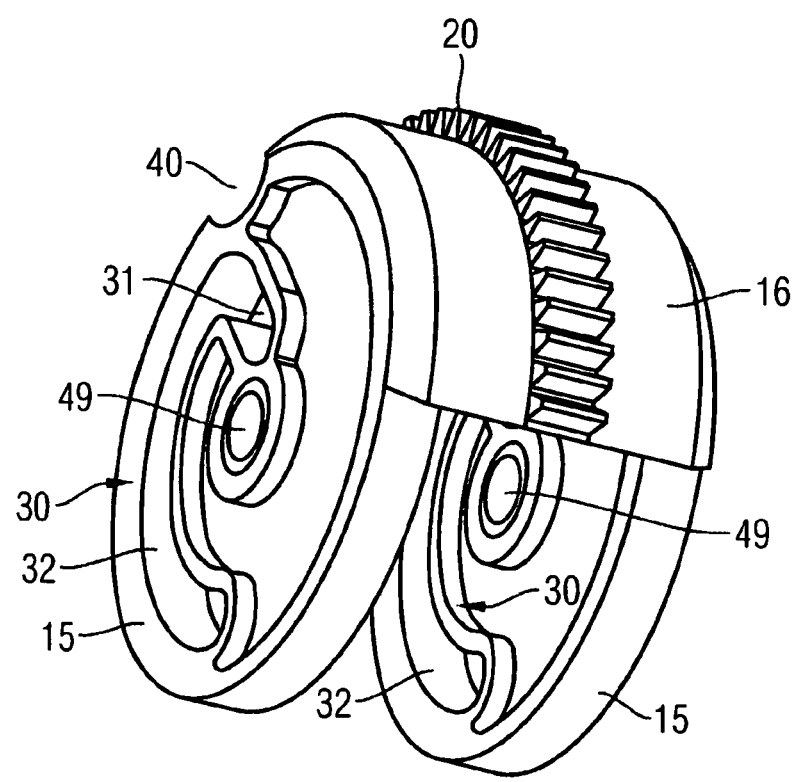
FIG. 9 shows a perspective view of the cover drive disks of the drive mechanism according to FIG. 6.
Figure 10:
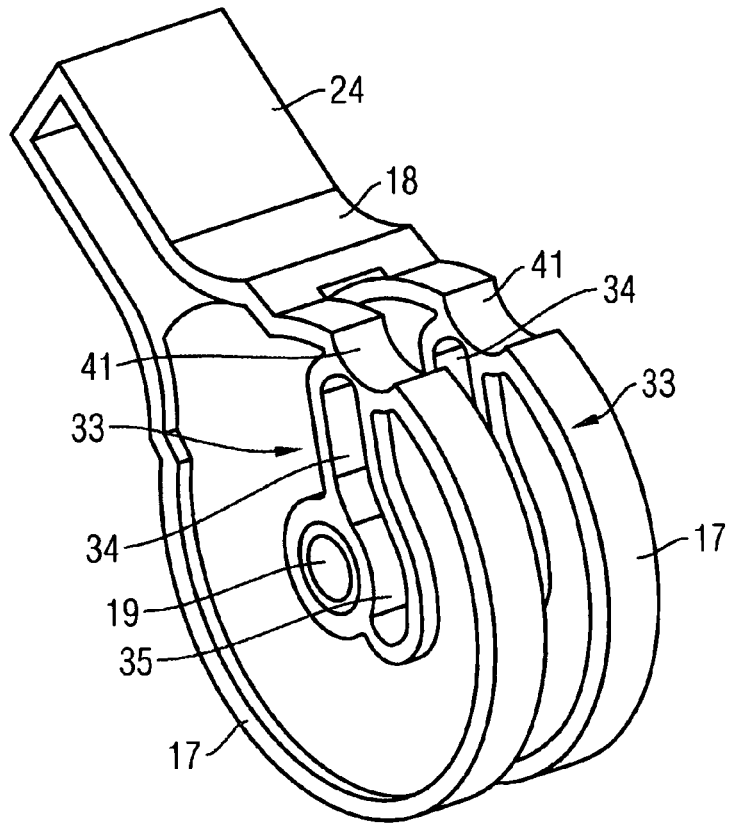
FIG. 10 shows a perspective view of the monitor drive disks of the drive mechanism according to FIG. 6.
Figure 11:
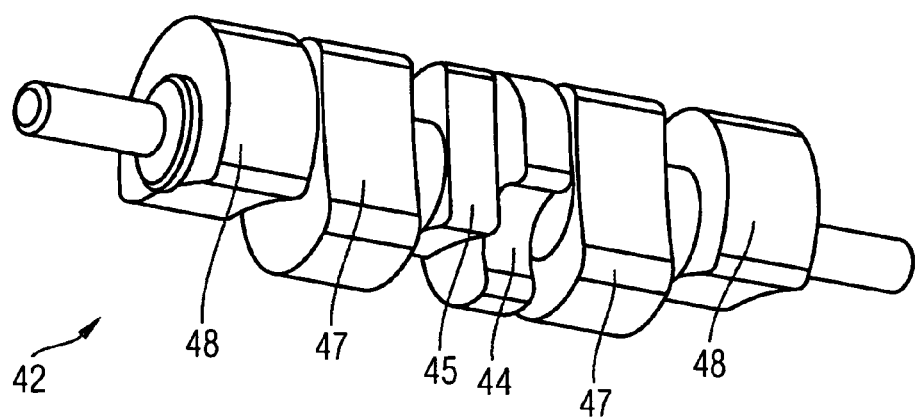
FIG. 11 shows a perspective view of the cam shaft of the drive mechanism according to FIG. 6.
Figure 12:
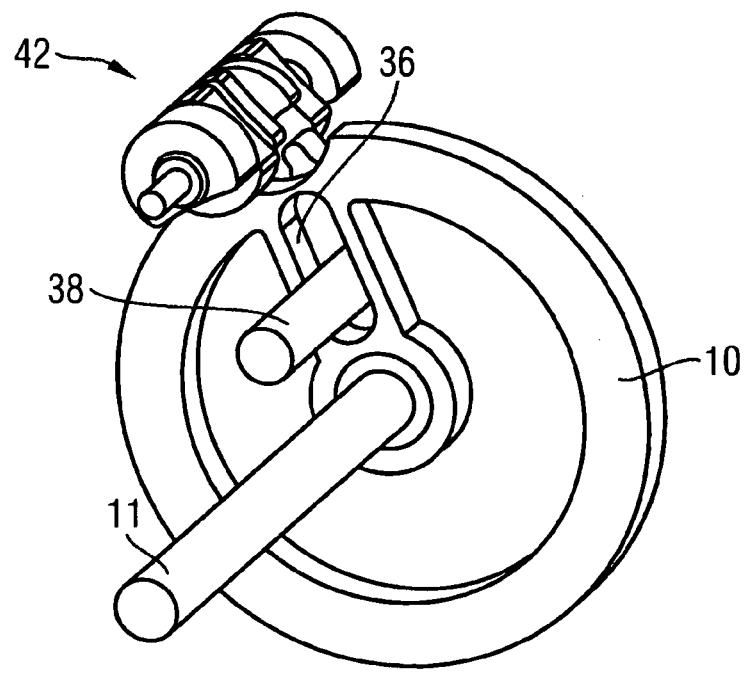
FIG. 12 shows a perspective view of the drive disk, cam shaft and coupling spigot of the drive mechanism according to FIG. 6.
Figure 13:
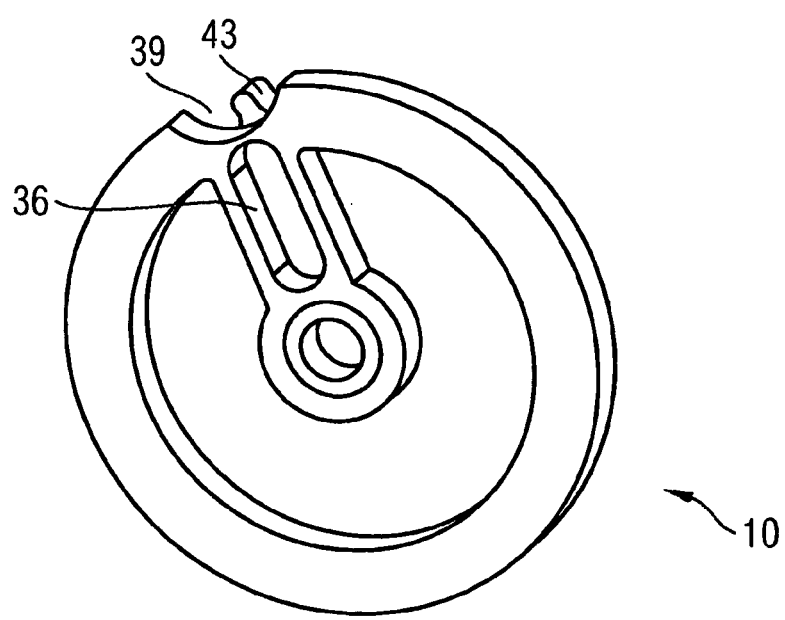
FIG. 13 shows a perspective view of the drive disk of the drive mechanism according to FIG. 6.

The on-board monitor device illustrated in FIGS. 1 to 4 is arranged in a recess 1 in a dashboard 2, wherein the recess 1 has an opening 3 which, in the inactive position illustrated in FIG. 1, is covered by a cover 5 when the monitor 4 is moved into the recess 1.

A common drive mechanism 6 can move the cover 5 in a driven fashion into a position which clears the opening 3 (FIG. 2), and said common drive mechanism 6 can subsequently move the monitor 4 into a moved-out active position (FIG. 4) via an intermediate position (FIG. 3).

In this active position, the monitor 4 is in a position which can be observed by a driver or front-seat passenger in a vehicle.

In the reverse sequence, the monitor 4 and cover 5 can be moved in a driven fashion back into their inactive position.

For the movement drive, the output shaft of a reversible electric motor 7 drives in rotation a spindle shaft 8, and the spindle shaft 8 drives in rotation a spindle wheel 9 which is arranged in a rotationally fixed fashion on a drive shaft 11, which can rotate about an axis, of a drive disk 10 of the drive mechanism 6 (illustrated in more detail in FIGS. 5 to 13).

The drive mechanism 6 has two identical control cams 13 which are arranged in parallel at a distance from one another and are fixedly arranged in the recess 1 of the dashboard 2 and are connected to one another at their edge by means of a web 12 to form a horseshoe-like component.

The control cams 13 are penetrated, transversely with respect to their plane, by the drive shaft 11 which is rotatably mounted in corresponding bearing bores 14 of the control cam 13.

Arranged between the two control cams 13 are two identical cover drive disks 15 which are also arranged at a distance from one another and are connected to one another at their edge by means of a web 16 to form a horseshoe-like component.

Said cover drive disks 15 have bearing bores 49 which pass through in the center transversely with respect to their plane and through which the drive shaft 11, on which the cover drive disks 15 are freely rotatably mounted, is guided through.

Arranged between the two cover drive disks 15 are in turn two identical monitor drive disks 17 which are arranged at a distance from one another and are connected to one another at their edge by means of a web 18 to form a horseshoe-like component.

They also have bearing bores 19 which pass through in the center transversely with respect to their plane and with which they are freely rotatably mounted on the drive shaft 11.

The drive disk 10 is arranged in the distance between the monitor drive disks 17, with the result that the drive disks 13, the cover drive disks 15, the monitor drive disks 17 and the control cams 10 form a sandwich-like packet.

The cover drive disks 15 have, at their edge region which runs around the periphery, a tooth sector 20 which is concentric with respect to the drive shaft 11 and which engages in a pinion 21 by which a toothed rack 22, which is guided in a guide groove 23 in the wall of the recess 1, can be moved linearly in a driven fashion.

The cover 5, which can be moved in a driven fashion, by the linear movement of the toothed rack 22, between the position which covers the opening 3 and the position which clears the opening 3, is in turn arranged on the toothed rack 22.

The monitor drive disks 17 have, at their edge region which runs around the periphery, a radially outwardly projecting lever 24 in the region of the web 18, which lever 24 is coupled in an articulated fashion by its free end to one end of a coupling lever 25.

By its other end, which is aligned approximately with the opening 3, the coupling lever 25 is coupled in an articulated fashion to a guide part 26 which is attached to the rear of the monitor 4 and projects away at a right angle from the rear of the monitor 4.

In the movement plane of the lever 24 and coupling lever 25 at a distance from one another, the guide part 26 with guide elements 27 is guided so as to be movable in a linear fashion in a second guide groove 28 and a third guide groove 29 in the wall of the recess 1.

The second guide groove 28 extends here approximately parallel to the first guide groove 23, while the third guide groove 29, which is arranged between the first guide groove 23 and the second guide groove 28, has, towards the opening 3, a distance which increases in opposition to the second guide groove 28.

The guide part 26 with its guide elements 27 can be moved between the ends of the second guide groove 28 and of the third guide groove 29 by means of the lever 24 of the monitor drive disk 17, as a result of which the monitor 4 can be moved both in the direction of extent of the second and third guide grooves 28 and 29 and can be pivoted in a driven fashion by the divergence of the two guide grooves 28 and 29 between an approximately horizontal attitude in the inactive position and a vertical attitude in the active position.

Identical cover drive grooves 30 which pass through axially, lie opposite one another axially and are composed of a tangential driving region 31 and a freewheeling region 32 which is concentric with respect to the axis of the drive shaft 11 are formed in the cover drive disks 15.

Here, the cover drive grooves 30 have a profile which begins with the driving region 31 which extends from the inactive position in the region of a relatively small radius into a region of a relatively large radius and is adjoined by the freewheeling region 32 with the relatively large radius which ends in the active position.

Identical monitor drive grooves 33 which also pass through axially, lie opposite one another axially and are composed of a tangential driving region 34 and a freewheeling region 35 which is concentric with respect to the axis of the drive shaft 11 are formed in the monitor drive disks 17.

The profile of the monitor drive grooves 33 begins in the inactive position with the freewheeling region 35 with the relatively small radius which is adjoined by the driving region 34 which ends in a region with a relatively large radius in the active position.

Of course, in order to vary the movement profile, the driving regions 31 and 34, the freewheeling regions 32 and 35 and the junctions between the driving regions 31 and 34 and the freewheeling regions 32 and 35 correspondingly can be configured with variations.

The drive disk 10 which is arranged in a rotationally fixed fashion on the drive shaft 11 has a radial driving groove 36 which extends at least between the relatively small radius and the relatively large radius of cover drive grooves 30 and monitor drive grooves 33.

Identical control grooves 37 which pass through axially and lie axially opposite one another are also formed in the control cams 13, the profile of which control grooves 37 corresponds to a combined profile of cover drive grooves 30 and monitor drive grooves 33, wherein some of these grooves, specifically their driving regions 31 and 34, overlap.

Parallel to the drive shaft 11, a coupling spigot 38 with a corresponding cylindrical cross section penetrates control grooves 37, driving groove 36, cover drive grooves 30 and monitor drive grooves 33 which have the same width, said cylindrical cross section moving along the profile of the control grooves 37 when the drive disk 10 is driven in rotation, in which case said cylindrical cross section entrains, in the driving regions 31 and 34, the cover drive disk 15 and/or the monitor drive disk 17 to bring about a rotational movement and said cylindrical cross section moves freely in the freewheeling regions 32 and 35 without entraining the cover drive disks 15 and/or monitor drive disks 17.

As a result, the matched movement profile, illustrated in FIGS. 1 to 4, of the cover 5 and monitor 4 is generated. At the concentric circumference of the drive disk 10, a semicircular recess or depression 39 which is radially open toward the outside is formed. The drive disk 10 has, axially next to the locking recess or depression 39, a switching tooth 43 which projects radially next to the region of the locking recess or depression 39.

Locking depressions 40 and 41 which are of the same type as the recess 39 are also formed on the cover drive disks 15 and the monitor drive disks 17.

In the region of the web 12 of the control cams 13, a cam shaft which is parallel to the axis of the drive shaft 11 is mounted in a freely rotatable fashion on the control cams 13. In the region lying radially opposite the switching tooth 43, the cam shaft 42 has a tooth gap 44 in which, given rotation of the drive disk 10, the switching tooth 43 can engage and rotate the cam shaft 42.

During this rotation, a blocking cam 45 which lies radially opposite the recess 39 passes freely through the recess 39 in order to enter into abutment, with one of its edges 46 against the circumferential contour of the drive disk 10, after the rotational drive of the cam shaft 42 by means of the switching tooth 43 ends. In this way, the drive disk 10 can rotate but the cam shaft 42 is prevented from rotating.

Corresponding locking cams 47 and 48 are arranged lying radially opposite the locking depressions 40 and 41 on the cam shaft 42, which locking cams 47 and 48 engage, given rotation of the cam shaft 42, in the respectively assigned locking depressions 40 and 41 and therefore can lock the cover drive disks 15 and/or monitor drive disks 17 against rotation.

The locking depressions 40 of the cover drive disks 15 and the locking cams 47, assigned to them, of the cam shaft 42 are arranged in such a way that when the end of the freewheeling region 32 is reached the locking cams 47 engage in the locking depressions 40 and lock the cover drive disks 15.

Correspondingly, the locking depressions 41 of the monitor drive disks 17 and the locking cams 48, assigned to them, of the cam shaft 42 are arranged in such a way that when the end of the freewheeling region 35 is reached the locking cams 48 engage in the locking depressions 41 and lock the monitor drive disks 17.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. An on-board monitor device for a monitor vehicle, comprising:
   a monitor adapted to move between an inactive position in a recess of a dashboard and an active position outside the recess of the dashboard;
   a cover adapted to close an opening of the recess when the monitor is in the inactive position;
   a drive mechanism coupled to the monitor and the cover;
   a fixed control cam having a control groove;
   a rotatably drivable drive disk having a radial driving groove;
   a rotatably mounted cover output disk for driving the cover having a cover drive groove;
   a rotatably mounted monitor output disk for movement drive of the monitor having a monitor drive groove;
   a coupling element adapted to engage the control groove, the radial driving groove, the cover drive groove, and the monitor drive groove,
   wherein the control cam, the drive disk, the mounted cover output disk, and the mounted monitor output disk are arranged next to each other and coaxially with respect to an axis,
   wherein the control groove has a profile which corresponds to the combined profile of the cover drive groove and the monitor drive groove, and
   wherein each of the cover drive groove and monitor drive groove have a freewheeling region concentric with respect to the axis and a tangential driving region, the movement profile of the cover and the monitor are based at least in part on the respective freewheeling regions of the cover drive groove and monitor drive groove.

2. The on-board monitor device according to claim 1, wherein the coupling element is a post having a cylindrical cross section, the coupling element engages the control groove, the radial driving groove, the cover drive groove, and the monitor drive groove by passing through each of the control groove, the radial driving groove, the cover drive groove, and the monitor drive groove, and wherein the coupling element is parallel to the axis.

3. The on-board monitor device according to claims 2, further comprising a drive shaft adapted to be rotatably driven by the drive mechanism, wherein the drive disk is rotationally fixed on the drive shaft.

4. The on-board monitor device according to claim 3, wherein at least one of a cover drive disk and the monitor drive disk are rotatably mounted on the drive shaft.

5. The on-board monitor device according to claim 1, wherein each of the profiles of the cover drive groove and monitor drive groove extends from an inactive position into an active position, opposite the rotational opening movement direction of the drive disk.

6. The on-board monitor device according to claim 5,
   wherein the monitor drive groove has a profile that begins in the inactive position, extending from the inactive position is the concentric freewheeling region with a relatively small radius adjoined by the driving region which ends in a region with a relatively large radius in the active position, and
   wherein the cover drive groove has a profile that begins in the inactive region, the driving region which extends from the inactive position having a relatively small radius into a region with a relatively large radius adjoined by the concentric freewheeling region with the relatively large radius which ends in the active position,
   wherein the driving regions of the monitor drive groove and cover drive groove are substantially the same.

7. The on-board monitor device according to claim 1, further comprising at least one of a second control cam, a second drive disk, a second cover drive disk and a second monitor drive disk, each of which arranged parallel to one another at a distance,
   wherein the drive disks are connected to one another by a drive disk web, the cover drive disks are connected to one another by a cover drive disk web, and the monitor drive disks are connected to one another by a monitor drive disk web.

8. The on-board monitor device according to claim 7, wherein the drive disks which are connected to one another by the drive disk web and the cover drive disks which are connected to one another by the cover drive disk web and the monitor drive disks which are connected to one another by the monitor drive disk web are arranged axially between two control cams, the two control cams being connected by a control cam web.

9. The on-board monitor device according to claim 8, wherein the at least one of the cover drive disk and the monitor drive disk can be locked in an end position of the respective freewheeling region of the at least one of the cover drive disk and the monitor drive disk.

10. The on-board monitor device according to claim 8, wherein at least one of the cover drive disk and the monitor drive disk has a locking depression adapted to radially engage with a locking cam on the respective radially extending circumference of the at least one of the cover drive disk and the monitor drive disk, concentric to the axis.

11. The on-board monitor device according to claim 10, wherein the locking earn is arranged on a cam shaft which is parallel to the axis and adapted to be driven in rotation by the drive disk.

12. The on-board monitor device according to claim 11, wherein the drive disk has a radial switching tooth adapted to engage in a tooth gap of the cam shaft.

13. The on-board monitor device according to claim 12, wherein the switching tooth and the locking cam for the at least one of the cover drive disk and the monitor drive disk are arranged on a common cam shaft one next to the other.

14. The on-board monitor device according to claim 13, wherein the at least one cam shaft is mounted on the at least one control cam.

15. The on-board monitor device according to claim 14, wherein the drive disk further comprises a recess having a circumferential contour next to the switching tooth, wherein a blocking cam arranged next to the tooth gap of the cam shaft is adapted to engage with the recess, wherein edges of the blocking cam abut the recess when engaged in the recess of the drive disk.

16. The on-board monitor device according to claim 1, wherein a cover drive disk further comprises a tooth sector concentric with respect to the axis configured to engage a pinion of a drive train for the movement drive of the cover.

17. The on-board monitor device according to claim 1, wherein the monitor drive disk further comprises a radial lever coupled at a free end in an articulated fashion to a drive coupling of a drive train for the movement drive of the monitor.

18. The on-board monitor device according to claim 3, wherein the drive mechanism is an electric motor.

* * * * *